(12) United States Patent
Firmbach et al.

(10) Patent No.: US 12,433,770 B2
(45) Date of Patent: Oct. 7, 2025

(54) MODULAR INSTRUMENT SYSTEM FOR USE IN A KNEE JOINT REPLACEMENT OPERATION

(71) Applicant: Aesculap AG, Tuttlingen (DE)

(72) Inventors: Franz-Peter Firmbach, Emmingen-Liptingen (DE); Housseyn Zouaghi, Chaumont (FR); Jana Bork, Radolfzell (DE)

(73) Assignee: Aesculap AG, Tuttlingen (DE)

( * ) Notice: Subject to any disclaimer, the term of this patent is extended or adjusted under 35 U.S.C. 154(b) by 163 days.

(21) Appl. No.: 18/466,514

(22) Filed: Sep. 13, 2023

(65) Prior Publication Data

US 2024/0099852 A1 Mar. 28, 2024

(30) Foreign Application Priority Data

Sep. 27, 2022 (DE) ...................... 10 2022 210 214.2

(51) Int. Cl.
| | |
|---|---|
| *A61F 2/46* | (2006.01) |
| *A61F 2/38* | (2006.01) |
| *A61F 2/30* | (2006.01) |

(52) U.S. Cl.
CPC .......... *A61F 2/4684* (2013.01); *A61F 2/3859* (2013.01); *A61F 2/389* (2013.01); *A61F 2/461* (2013.01); *A61F 2/4657* (2013.01); *A61F 2002/30736* (2013.01); *A61F 2002/4661* (2013.01)

(58) Field of Classification Search
CPC .... A61F 2/30724; A61F 2/3859; A61F 2/389; A61F 2/46; A61F 2/4603; A61F 2/461; A61F 2/4657; A61F 2/4684; A61F 2002/30599; A61F 2002/30604; A61F 2002/30607; A61F 2002/30616; A61F 2002/30736; A61F 2002/4661
See application file for complete search history.

(56) References Cited

U.S. PATENT DOCUMENTS

| | | | | |
|---|---|---|---|---|
| 5,702,464 | A | * 12/1997 | Lackey ................. | A61F 2/4684 623/20.32 |
| 9,149,206 | B2 | * 10/2015 | Claypool .............. | A61F 2/4684 |
| 10,195,056 | B2 | * 2/2019 | Wogoman .......... | A61B 17/1604 |
| 10,603,188 | B2 | * 3/2020 | Uthgenannt .......... | A61F 2/3859 |
| 11,571,309 | B2 | * 2/2023 | Reeder ................. | A61F 2/3859 |
| 11,969,360 | B2 | * 4/2024 | Dressler ............... | A61F 2/4657 |
| 2008/0051908 | A1 | * 2/2008 | Angibaud ............. | A61F 2/389 623/20.32 |
| 2011/0178605 | A1 | * 7/2011 | Auger .................. | A61F 2/3868 623/20.15 |

(Continued)

FOREIGN PATENT DOCUMENTS

| | | | | |
|---|---|---|---|---|
| CN | 110051456 | A | 7/2019 | |
| DE | 102022210214 | A1 | * 3/2024 | ......... A61F 2/30724 |

(Continued)

*Primary Examiner* — Eric S Gibson
(74) *Attorney, Agent, or Firm* — Christopher A. Rothe; CM Law

(57) ABSTRACT

A modular instrument system for use in a knee joint replacement operation includes a tibial component, a first femoral component, a second femoral component and at least one spacer element. The different components of the modular instrument system are releasably connectable to one another to form different instrument configurations.

17 Claims, 13 Drawing Sheets

(56) References Cited

U.S. PATENT DOCUMENTS

| | | | | |
|---|---|---|---|---|
| 2013/0261758 | A1* | 10/2013 | Claypool | A61F 2/4684 623/20.32 |
| 2014/0172112 | A1* | 6/2014 | Marter | A61F 2/4684 606/86 R |
| 2014/0296859 | A1* | 10/2014 | Claypool | A61B 17/157 606/88 |
| 2015/0359642 | A1* | 12/2015 | Claypool | A61F 2/4657 623/20.32 |
| 2016/0346098 | A1* | 12/2016 | Uthgenannt | A61F 2/4684 |
| 2017/0105848 | A1* | 4/2017 | Wogoman | A61B 17/1675 |
| 2019/0380721 | A1* | 12/2019 | McMinn | A61F 2/461 |
| 2021/0068965 | A1* | 3/2021 | Heldreth | A61F 2/30771 |
| 2022/0096244 | A1* | 3/2022 | Reeder | A61F 2/4684 |
| 2022/0096248 | A1* | 3/2022 | Dressler | A61F 2/4657 |
| 2022/0168111 | A1* | 6/2022 | Green | A61F 2/389 |
| 2024/0099852 | A1* | 3/2024 | Firmbach | A61F 2/30724 |

FOREIGN PATENT DOCUMENTS

| | | | | | |
|---|---|---|---|---|---|
| EP | 3302370 | B1 | | 4/2018 | |
| EP | 4344681 | A1 | * | 4/2024 | A61F 2/30724 |
| JP | 2024048372 | A | * | 4/2024 | A61F 2/30724 |
| WO | WO-2012004580 | A1 | * | 1/2012 | A61B 17/025 |
| WO | WO-2016196158 | A1 | * | 12/2016 | A61F 2/3859 |
| WO | WO-2017155995 | A1 | * | 9/2017 | |
| WO | 2020037380 | A1 | | 2/2020 | |
| WO | WO-2022072977 | A1 | * | 4/2022 | A61B 17/025 |
| WO | WO-2022119777 | A1 | * | 6/2022 | A61F 2/30734 |
| WO | WO-2022229028 | A1 | * | 11/2022 | A61F 2/389 |
| WO | WO-2023280749 | A1 | * | 1/2023 | A61B 17/025 |

* cited by examiner

MODULAR INSTRUMENT SYSTEM FOR USE IN A KNEE JOINT REPLACEMENT OPERATION

CROSS-REFERENCE TO RELATED APPLICATION(S)

This application claims priority under 35 U.S.C. § 119 to German Application No. 10 2022 210 214.2, filed on Sep. 27, 2022, the content of which is incorporated by reference herein in its entirety.

FIELD

The invention relates to a modular instrument system for use in a knee joint replacement operation.

BACKGROUND

In a knee joint replacement operation, or total knee arthroplasty (TKA), joint surfaces of the femur and/or tibia that have become worn or have been otherwise affected by disease or by injury are replaced by artificial joint surfaces of a knee joint prosthesis. Such knee joint prostheses usually comprise a femoral component, a tibial component and a meniscus component. The femoral component is implanted at the distal end of the femur. The tibial component is implanted at the proximal end of the tibia. The meniscus component is often also referred to as a glide surface or cartilage replacement and is arranged between the femoral and tibial components.

The distal femur and the proximal tibia are resected before the prosthetic components are implanted. For this purpose, the surgeon makes various resection cuts and detaches bone and/or cartilage material from the respective bone. The resection enables the respective bone to be adapted in its shape to the prosthetic component that is to be received.

In TKA, a basic distinction is made between two different surgical approaches, also known as the measured resection technique (MRT) and gap balancing (GB).

In the MRT, the respective bone is resected by the implant thickness, after which a ligament release is performed, in which individual ligaments of the knee are cut through or stretched. This is intended to achieve an overall balanced ligament tension during the movement of the knee joint.

In contrast to the MRT, in gap balancing the resection of the femur is adapted to the prevailing ligament tension, which in some cases leads to different resection heights medially and laterally. A distinction is made between what is called the extension gap technique (EGT) and the flexion gap technique (FGT). In the EGT, the flexion gap is adapted to the extension gap. In the FGT, conversely, the extension gap is adapted to the flexion gap. Regardless of the approach, the extension gap and the flexion gap are always measured.

SUMMARY

The object of the present invention is to make available a modular instrument system of the type mentioned above, which offers advantages over the prior art and which in particular permits versatile use even with different surgical techniques.

The modular instrument system according to the invention comprises at least a tibial component, a first femoral component, a second femoral component and a spacer element. The different components of the modular instrument system can be used in combination with one another in different ways. The modular instrument system is configured for forming at least a first instrument configuration and a second instrument configuration. The first instrument configuration is intended for use in at least a first surgical technique. The second instrument configuration is intended for use in at least a second surgical technique. By virtue of the solution according to the invention, the modular instrument system can be used in a particularly versatile manner. This offers a variety of advantages over spacer systems known from the prior art, which are normally only able to be used for a single surgical technique. The tibial component has a topside and a preferably parallel opposite underside. The underside has a distally oriented, flat contact surface. The contact surface of the underside of the tibial component is configured to bear on a resected proximal tibia. The first femoral component has a topside and a parallel opposite underside, wherein the topside has a proximally oriented, flat first contact surface. The first contact surface is spaced apart from the underside of the first femoral component by a proximodistal first thickness and is configured to bear on a resected femur. The first femoral component can be placed on the resected distal femur and on the resected posterior femur. This allows both the extension gap and the flexion gap to be measured. The second femoral component has a topside and a parallel opposite underside, wherein the topside has a proximally oriented, flat second contact surface. The second contact surface is spaced apart from the underside of the second femoral component by a proximodistal second thickness and is configured to bear on a distal femoral cutting jig and to alternatively bear on a posterior femoral cutting jig. Depending on the instrument configuration, either the first femoral component or the second femoral component is used. Should the femur not yet be resected, it is generally conceivable that a further instrument configuration only comprises the tibial component and the at least one spacer element and is used in a surgical technique in which it is not essential to measure against a cutting jig. The spacer element has a topside and an underside spaced apart in parallel by a proximodistal spacing thickness. The underside of the spacer element has a distal connecting portion. The distal connecting portion of the spacer element is configured for releasable connection to a complementary proximal connecting portion of the topside of the tibial component. The topside of the spacer element has a proximal connecting portion. The latter is configured for releasable connection to a complementary distal connecting portion of the underside of the first femoral component and for alternative releasable connection to a complementary distal connecting portion of the underside of the second femoral component. Depending on the first or second instrument configuration, the proximal connecting portion of the spacer element is releasably connected either to the distal connecting portion of the first femoral component or to the distal connecting portion of the second femoral component. The first femoral component and the second femoral component differ primarily in terms of their proximodistal thickness. The first femoral component reproduces the proximodistal thickness of a femoral implant or also a femoral trial implant. The first femoral component, more precisely its first contact surface, forms a defined bearing for the resected (distal or posterior) femur. The second femoral component used in the second instrument configuration, or more precisely its second contact surface, provides a defined bearing for the distal femoral cutting jig or alternatively for the posterior femoral cutting jig. Together with the posterior femoral cutting jig, the second femoral component reproduces the anteroposterior thickness of the femoral trial implant or femoral implant. Alternatively, the second femoral component together with the distal femoral cutting jig reproduces the proximodistal thickness of said femoral trial implant and/or femoral implant. The connecting portions of the different components of the modular instrument system are preferably configured for force-fit and/or form-fit connection to the respective complementary connecting portion. Preferably, the connecting portions are plug-in, latching and/or clamping portions. The instrument system can also be used for what is called trialing.

The position and direction designations used in this description refer to the body of a patient, in particular to the tibia, and should be understood in this respect in accordance with their usual anatomical meaning. Consequently, "anterior" denotes front or lying to the front, "posterior" denotes rear or lying to the rear, "medial" denotes inner or lying to the inside, "lateral" denotes outer or lying to the outside, "proximal" denotes towards the centre of the body, and "distal" denotes away from the centre of the body. Furthermore, "proximodistal" denotes along, preferably parallel to, a proximal-distal axis, "anteroposterior" denotes along, preferably parallel to, an anterior-posterior axis, and "mediolateral" denotes along, preferably parallel to, a medial-lateral axis. The aforementioned axes are orthogonal to one another and can of course be understood in relation to X, Y and Z axes not associated with the anatomy of the patient. For example, the proximodistal axis can alternatively be called the X axis. The mediolateral axis can be called the Y axis. The anteroposterior axis can be called the Z axis. For the sake of better understanding and simplicity of the designations, the aforementioned anatomical position and direction designations are primarily used in the following. In addition, designations such as "topside" are used in relation to a distal direction of viewing. On the other hand, designations such as "underside" are used in relation to a proximal direction of viewing.

In one embodiment, the first thickness is greater than the second thickness. In other words, the first femoral component is thicker than the second femoral component. This makes it possible to achieve a requirement-oriented referencing and/or attachment to the resected distal femur (in extension) or resected posterior femur (in flexion) on the one hand and to the distal femoral cutting jig or alternatively to the posterior femoral cutting jig on the other hand. The first thickness of the first femoral component is preferably between 7 mm and 11 mm, preferably between 8 mm and 10 mm, particularly preferably 9 mm. The second thickness of the second femoral component is preferably between 4 mm and 6 mm, preferably 5 mm. In a preferred embodiment, the first thickness is 9 mm and the second thickness is 5 mm.

In one embodiment, a plurality of spacer elements of different thicknesses with different spacing thicknesses are present, wherein the plurality of spacer elements of different thicknesses can be interchangeably used individually and/or can be used in combination stacked on top of one another. The spacer elements of different thicknesses define different thicknesses of the glide surface that is to be implanted. By interchanging the different spacer elements or by using them in combination stacked on top of one another, the proximodistal thickness of the respective instrument configuration can be adjusted. The adjustment is done with the aim of a balanced ligament tension under extension and/or flexion. In one embodiment, the plurality of spacer elements also comprise spacer elements with identical spacing thickness. In one embodiment, the different spacer elements can be interchangeably used individually. In this case, the different spacing thicknesses are preferably 10 mm, 11 mm, 12 mm, 14 mm, 16 mm, 18 mm, 22 mm and 26 mm. In a further embodiment, the different spacer elements can be used in combination stacked on top of one another. In this configuration, the spacing thicknesses are preferably 10 mm, 11 mm, 12 mm, 4 mm and 8 mm. The spacer elements with thicknesses of 10 mm, 11 mm and 12 mm can also be referred to as "base plates". The spacer elements with a spacing thickness of 4 mm, for example, can also be referred to as "additional height plates". In one embodiment, different "additional height plates" with different spacing thicknesses are available. In order to form a required total thickness, preferably one of said base plates is used with one or more additional height plates stacked on top of one another. In this embodiment, the spacer elements stackable on top of one another preferably have connecting portions complementary to one another. By means of the complementary connecting portions, the spacer elements stacked on top of one another can be releasably connected to one another. A plug-in, latching and/or clamping connection is preferred.

In one embodiment, a third femoral component is present and has a topside and an underside spaced apart in parallel by a proximodistal third thickness, wherein the topside has a proximal linear guide portion, which is configured for anteroposterior linearly movable guiding on a complementary linear guide portion of a femoral measuring block, wherein the underside has a distal linear guide portion, which is configured for anteroposterior linearly movable guiding on a proximal linear guide portion of the topside of the at least one spacer element, and wherein the modular instrument system is configured for forming a further (third) instrument configuration, in which the third femoral component and the at least one spacer element are connected releasably and movably relative to each other by means of their complementary linear guide portions. The third instrument configuration permits use in at least one further surgical technique. The third femoral component reproduces the posterior thickness of the femoral trial implant and/or femoral implant. The third femoral component is guided linearly movably in the anteroposterior direction by means of said linear guide portions. The guiding is carried out on the one hand on the femoral measuring block. The latter is not part of the modular instrument system. On the other hand, the guiding is carried out at the topside of the at least one spacer element or one of the plurality of different spacer elements, provided that a plurality of spacer elements are present. The linear guiding allows the third femoral component to be shifted anteriorly and posteriorly relative to the femoral measuring block and/or the spacer element during use. This enables a particularly advantageous determination of the joint gap. In addition, the third femoral component is held securely on the further components of the third instrument configuration by means of its linear guide portions. This results in ergonomic advantages ("free hand working"). The third thickness of the third femoral component is preferably between 7 mm and 11 mm, preferably between 8 mm and 10 mm, particularly preferably 9 mm.

In one embodiment, the proximal linear guide portion of the third femoral component has at least one guide groove which is distally recessed into the topside, extends in the anteroposterior direction and is undercut mediolaterally. The at least one guide groove is configured for sliding interaction with the complementary linear guide portion of the femoral measuring block. On account of the mediolateral undercut of the guide groove, the complementary linear guide portion of the femoral measuring block is held with form-fit engagement in the guide groove in the proximodistal direction.

In one embodiment, the distal linear guide portion of the third femoral component has at least one guide pin protruding distally from the underside, and the proximal linear guide portion of the at least one spacer element has at least one guide groove which is distally recessed into the topside, extends in the anteroposterior direction and is undercut mediolaterally. The guide pin and the guide groove interact in an anteroposterior gliding movement and otherwise with form-fit engagement. For form-fit engagement in the proximodistal direction, the guide groove is undercut mediolaterally. The guide pin is preferably designed complementing the undercut. For example, at its distal end, the guide pin has a mushroom head, a radial extension or the like. Preferably, the third femoral component has two guide pins spaced mediolaterally apart from each other. In this case, the at least one spacer element preferably has two guide grooves spaced mediolaterally apart from each other.

In one embodiment, at least one augmentation element is present and has a proximal augmentation surface for bearing on the resected distal femur and a distal connecting portion which is configured for releasable connection to a proximal connecting portion of the first femoral component, wherein the modular instrument system is configured for forming a further (fourth) instrument configuration, in which the augmentation element is mounted on the contact surface of the first femoral component. By means of the at least one augmentation element, a possible defect on the resected femur can be compensated dimensionally. This is particularly advantageous in revision surgery. The proximal augmentation surface is smaller, in the anteroposterior and mediolateral directions, than the first contact surface of the first femoral component. In other words, the first contact surface is only augmented locally. The distal connecting portion of the augmentation element and the complementary proximal connecting portion of the first femoral component permit a form-fit and/or force-fit releasable connection. A plug-in, latching and/or clamping connection is preferred.

In one embodiment, the first femoral component has a plurality of proximal connecting portions, which are respectively recessed into the topside of the first femoral component and spaced apart mediolaterally and/or anteroposteriorly from each other. The plurality of proximal connecting portions are each configured for releasable connection to the distal connecting portion of the at least one augmentation element. As a result, the augmentation element can optionally be releasably fastened in different positions on the first contact surface. If a plurality of augmentation elements are present, they can be mounted in combination on respectively one of the proximal connecting portions of the first femoral component. In addition, it is conceivable that a plurality of augmentation elements stacked on top of one another and connected to one another are mounted on the first femoral component.

In one embodiment, a plurality of differently shaped and/or different-sized augmentation elements are present and can be used interchangeably with one another. In one embodiment, the different augmentation elements have a differently shaped outer contour. In a further embodiment, the augmentation elements are alternatively or additionally of different sizes, in particular with regard to their anteroposterior and/or mediolateral and/or proximodistal dimension.

In one embodiment, a handle is present and has at least one manually actuated coupling device, which is configured for releasable coupling to a coupling portion of the at least one spacer element. By means of the handle, the respective instrument configuration can be advantageously inserted ergonomically into the joint gap and removed therefrom. In this respect, the handle primarily offers ergonomic advantages. For coupling to the respective instrument configuration, the handle has at least one manually actuated coupling device. The coupling device is configured for releasable coupling to the complementary coupling portion of the at least one spacer element. If the modular instrument system has a plurality of different spacer elements, preferably each of the spacer elements has such a coupling portion. The coupling is by form-fit and/or force-fit engagement. In different embodiments, the coupling device and the complementary coupling portion form a releasable plug-in, latching and/or clamping connection. Preferably, the coupling device is arranged one end of the handle. Preferably, the coupling device can be transferred manually between a coupling state and a release state. In the coupling state, the at least one spacer element is coupled releasably to the handle by means of the coupling device. The coupling is released in the release state.

In one embodiment, the handle extends between a first end and a second end and has a respective coupling device at both ends. This is a particularly preferred embodiment of the invention. The two coupling devices allow the handle to be coupled to an instrument configuration on both sides. The instrument configurations can have different total thicknesses. The instrument configurations coupled to the handle in this way can be alternately inserted into and removed from the joint gap simply and ergonomically by the surgeon in order to determine the joint gap.

In one embodiment, at least one tibial trial plateau is present and has a topside and a distally opposite underside, wherein the underside has a distally oriented fastening surface for fastening to the resected proximal tibia, wherein the topside has a proximal connecting portion which is configured for releasable connection to the distal connecting portion of the at least one spacer element, and wherein the modular instrument system is configured for forming a further (fifth) instrument configuration, in which the at least one spacer element and the tibial trial plateau are releasably connected to each other. In simple terms, the tibial component and the tibial trial plateau can be exchanged for each other. In contrast to the tibial component, the tibial trial plateau is configured for attachment to the proximal tibia. The tibial component is only configured to bear on the proximal tibia and is thus movable in use in an anteroposterior and a mediolateral direction. The proximal connecting portion at the topside of the tibial trial plateau is preferably identical to the proximal connecting portion at the topside of the tibial component. The further (fifth) instrument configuration is provided for use according to at least one further surgical technique.

In one embodiment, a plurality of different-sized tibial trial plateaus are present and can be used interchangeably with one another. The tibial trial plateaus are preferably different in terms of their mediolateral and/or anteroposterior dimensions. By contrast, the tibial component is preferably only present in a single size. By virtue of the plurality of different-sized tibial trial plateaus, the modular instrument system can be used on different-sized tibial bones.

In one embodiment, at least one tibial plateau is present and has a topside and a distal anchoring pin for anchoring to the resected proximal tibia, wherein the topside has a proximal connecting portion which is configured for releasable connection to the distal connecting portion of the at least one spacer element, and wherein the modular instrument system is configured for forming a further (sixth) instrument configuration, in which the at least one spacer element and the tibial plateau are releasably connected to each other. With the at least one tibial plateau, the modular instrument system can be used in a particularly versatile way. In simple terms, the tibial plateau is interchangeable with the tibial component and/or the tibial trial plateau, and vice versa. The further (sixth) instrument configuration is provided for use according to at least one further surgical technique and/or for use in one or more of the aforementioned surgical techniques.

In one embodiment, a plurality of different-sized tibial plateaus are present and can be used interchangeably with one another. The different-sized tibial plateaus have different anteroposterior and/or mediolateral dimensions. By virtue of the plurality of different-sized tibial plateaus, the modular instrument system can be used on different-sized tibial bones.

BRIEF DESCRIPTION OF THE DRAWINGS

Further advantages and features of the invention will become clear from the following description of preferred exemplary embodiments of the invention, which are shown in the drawings.

DETAILED DESCRIPTION

Figure 1:
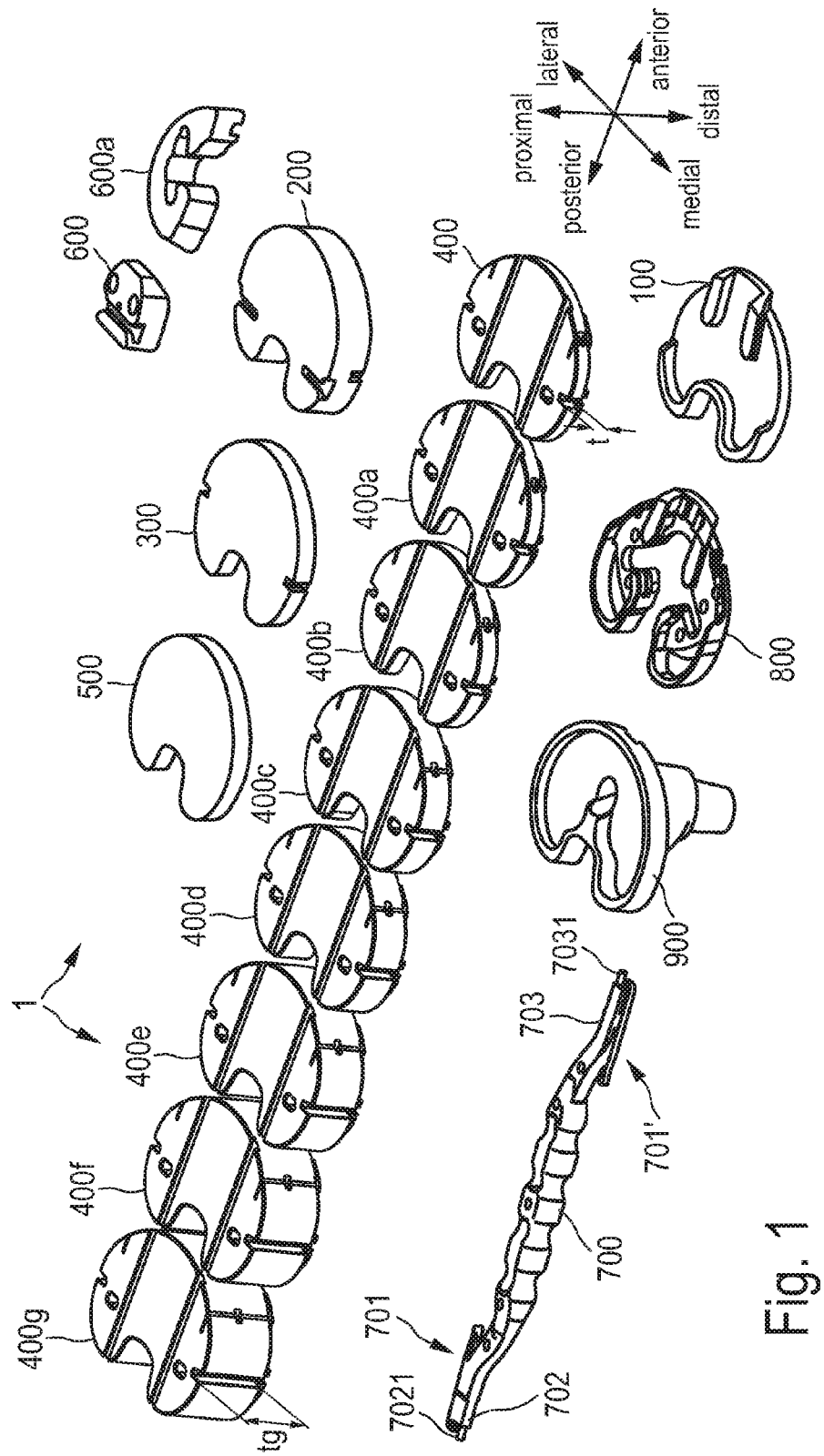
FIG. 1 shows a schematic perspective view of an embodiment of a modular instrument system according to the invention.

According to FIG. 1, a modular instrument system 1 is provided for use in a knee joint replacement operation. The modular instrument system 1 can also be referred to as a modular spacer system and is used for determining and/or balancing a joint gap between the tibia and the femur in a total knee arthroplasty (TKA). By means of the spacer system, it is possible, for example in the context of gap balancing (GB), to determine among other things a required proximodistal thickness of a meniscus component (glide surface) of a knee joint prosthesis to be implanted, and to test the stability of the knee joint in extension or flexion. The modular spacer system 1 permits the application of different surgical techniques. For this purpose, different components of the modular spacer system 1, which are to be explained in more detail, are releasably connected to one another to form different instrument configurations.

In the illustrated embodiment, the modular instrument system 1 comprises a tibial component 100, a first femoral component 200, a second femoral component 300, at least one spacer element 400, a third femoral component 500, at least one augmentation element 600, a handle 700, a tibial trial plateau 800 and a tibial plateau 900.

Not all of the aforementioned components of the modular instrument system 1 are to be considered essential with regard to the present invention. Accordingly, in embodiments not shown in the figures, not all of said components are present. In an embodiment not shown in the figures, the modular instrument system has no third femoral component and/or no augmentation element and/or no handle and/or no tibial trial plateau and/or tibial plateau. The combination of the components shown in FIG. 1 is to be regarded as purely exemplary in this respect.

Figure 2:
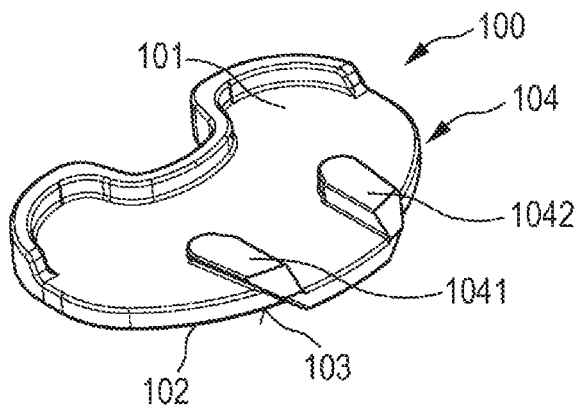
FIG. 2 shows a schematic perspective view of a tibial component of the instrument system according to FIG. 1.

The tibial component 100 (FIG. 2) has a topside 101 and a distally opposite underside 102. The underside 102 has a distally oriented contact surface 103. The contact surface 103 is flat and is configured to bear on a resected proximal tibia. In the use of the tibial component 100, the contact surface 103 is movable in an anteroposterior and/or mediolateral direction relative to the resected proximal tibia. The topside 101 of the tibial component 100 has a proximal connecting portion 104. The proximal connecting portion 104 is configured for releasable connection to a complementary distal connecting portion of the at least one spacer element 400. In the embodiment shown, the proximal connecting portion 104 has sub-portions 1041, 1042. Depending on whether use is taking place on a left or a right knee, the sub-portions 1041, 1042 can also be referred to as the medial connecting sub-portion 1041 and the lateral connecting sub-portion 1042, or vice versa. In the present case, the connecting sub-portions 1041, 1042 are arranged anteriorly on the topside 101. The specific design of the connecting portion 104 and/or of the connecting sub-portions 1041, 1042 is not essential as regards the present invention. It is crucial that the proximal connecting portion 104 allows a releasable connection to the complementary distal connecting portion of the at least one spacer element 400.

Figure 17:
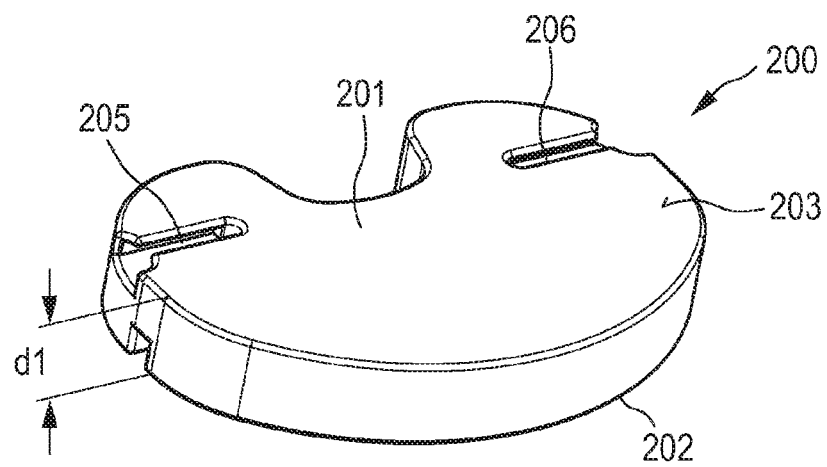
FIG. 17 shows a schematic perspective view of a first femoral component of the instrument system according to FIG. 1.
Figure 18:
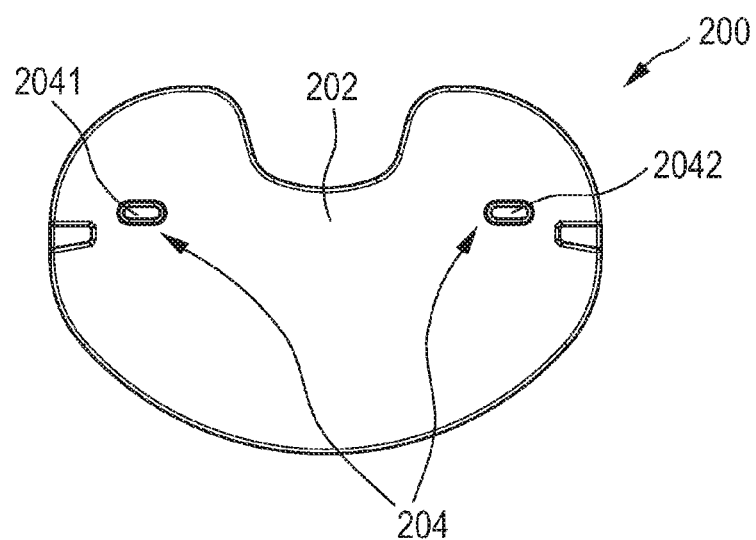
FIG. 18 shows a schematic bottom view of the first femoral component according to FIG. 17.
Figure 19:
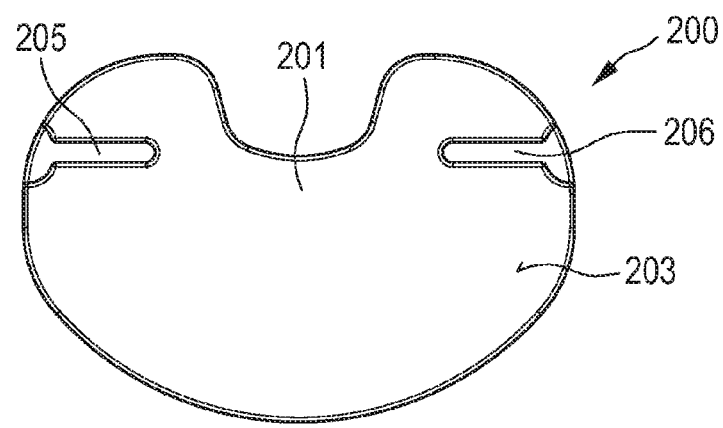
FIG. 19 shows a schematic top view of the first femoral component according to FIGS. 17 and 18.

The first femoral component 200 (see FIGS. 17, 18, 19) has a topside 201 and a parallel opposite underside 202. The topside 201 has a proximally oriented flat first contact surface 203. The first contact surface 203 is spaced apart from the underside 203 by a proximodistal first thickness d1. The first contact surface 203 is configured to bear on a resected distal femur and/or a resected posterior femur. The first thickness d1 represents the proximodistal thickness of the femoral trial implant and/or femoral implant to be implanted. The underside 202 of the first femoral component 200 has a distal connecting portion 204. The distal connecting portion 204 is configured, in a manner to be described in more detail, for releasable connection to a complementary proximal connecting portion of the at least one spacer element 400. In the illustrated embodiment, the distal connecting portion 204 has two connecting sub-portions 2041, 2042 spaced apart mediolaterally from each other. The specific design of the distal connecting portion 204 is not essential as regards the present invention. It is crucial that the distal connecting portion 204 allows a releasable connection to the complementary proximal connecting portion of the at least one spacer element 400.

Figure 25:
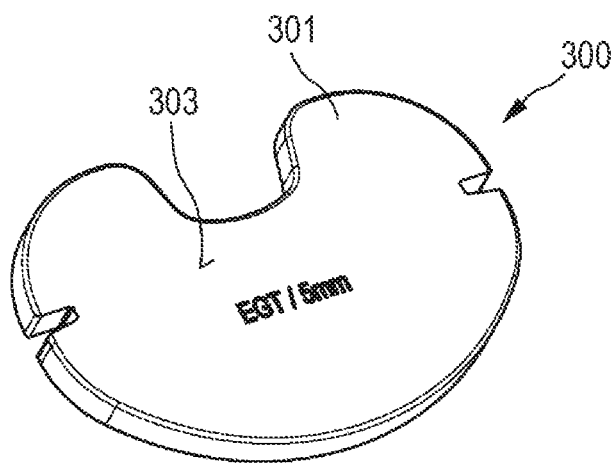
FIG. 25 shows a schematic perspective view of a second femoral component of the instrument system according to FIG. 1.
Figure 26:
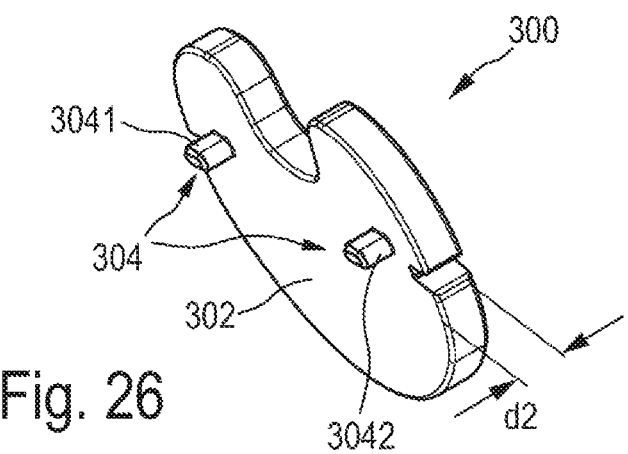
FIG. 26 shows a further schematic perspective view of the second femoral component according to FIG. 25.

The second femoral component 300 (see FIGS. 25, 26, 27) has a topside 301 and a parallel opposite underside 302. The topside 301 has a proximally oriented, flat second contact surface 303. The second contact surface 303 is spaced apart from the underside 302 by a proximodistal second thickness d2. The second contact surface is configured to bear on a distal femoral cutting jig and to alternatively bear on a posterior femoral cutting jig. Both the distal femoral cutting jig and the posterior femoral cutting jig are not part of the modular instrument system 1. The design and function of such cutting jigs are known in principle to a person skilled in the art. Further explanations to this effect are therefore not necessary. The underside 302 of the second femoral component 300 has a distal connecting portion 304. The distal connecting portion 304 is configured for releasable connection to the aforementioned complementary proximal connecting portion of the at least one spacer element 400. In the illustrated embodiment, the distal connecting portion 304 has two connecting sub-portions 3041, 3042 spaced apart mediolaterally from each other. As regards the further design of the distal connecting portion 304, what has been said concerning the distal connecting portion 204 of the first femoral component 200 applies mutatis mutandis. The first femoral component 200 and the second femoral component 300 can optionally be connected to the at least one spacer element 400. The distal connecting portions 204, 304 are accordingly identical.

The at least one spacer element (see FIGS. 5 and 6) has a topside 401 and a parallel opposite underside 402. The topside 401 is oriented proximally. The underside 402 is oriented distally. The topside 401 and the underside 402 are spaced from each other by a proximodistal spacing thickness t (see FIG. 1). In other words, the spacer element 400 has a proximodistal thickness t. The topside 401 has a proximal connecting portion 404. The proximal connecting portion 404 is configured for releasable connection to the distal connecting portion 204 of the first femoral component 200 (see FIG. 18) or optionally for releasable connection to the distal connecting portion 304 of the second femoral component 300 (see FIG. 26). Said proximal and distal connecting portions are correspondingly matched to each other in terms of their shape and/or dimension. The proximal connecting portion 404 of the topside 401 of the spacer element 400 accordingly has two connecting sub-portions 4041, 4042 spaced mediolaterally apart from each other.

In the illustrated embodiment, the proximal connecting portion 404 is distally recessed into the topside 401 of the spacer element 400. The distal connecting portions 204, 304 protrude, in a complementary manner to this, distally from the respective underside 202, 302. In particular, the connecting sub-portions 4041, 4042 can also be referred to in each case as a plug receptacle. Accordingly, the complementary connecting sub-portions 2041, 2042, 3041, 3042 can also be referred to in each case as a plug-in element. In the illustrated embodiment, the releasable connection between the spacer element 400 and the respective femoral component 200, 300 is accordingly a releasable plug connection. In an interconnected state, said components are positively fixed relative to each other anteroposteriorly and/or mediolaterally. In addition, said components are releasably held together proximodistally.

The underside 402 of the spacer element 400 has a distal connecting portion 403. The distal connecting portion 403 is configured for releasable connection to the proximal connecting portion 104 of the tibial component 100 (see FIG. 2). Said connecting portions are complementary to each other. Accordingly, the distal connecting portion 403 has two connecting sub-portions 4031, 4032 spaced apart mediolaterally from each other. For the releasable connection to the tibial component, the distal connecting sub-portions 4031, 4032 can be latched onto the respective proximal connecting sub-portion 1041, 1042.

Figure 20:
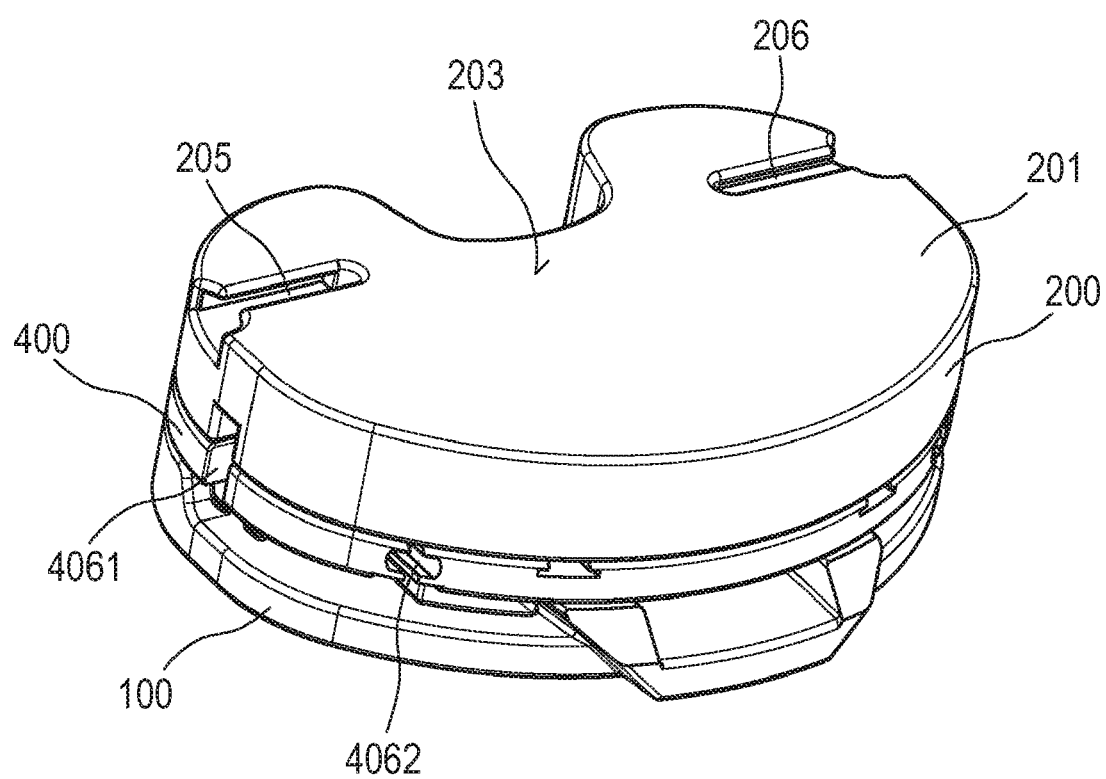
FIG. 20 shows a schematic perspective view of a further instrument configuration of the instrument system according to FIG. 1, in which the first femoral component is releasably connected to the spacer element and the tibial component.

FIG. 20 shows an instrument configuration formed using the modular instrument system 1. Said instrument configuration comprises the tibial component 100, the at least one spacer element 400 and the first femoral component 200.

Figure 27:
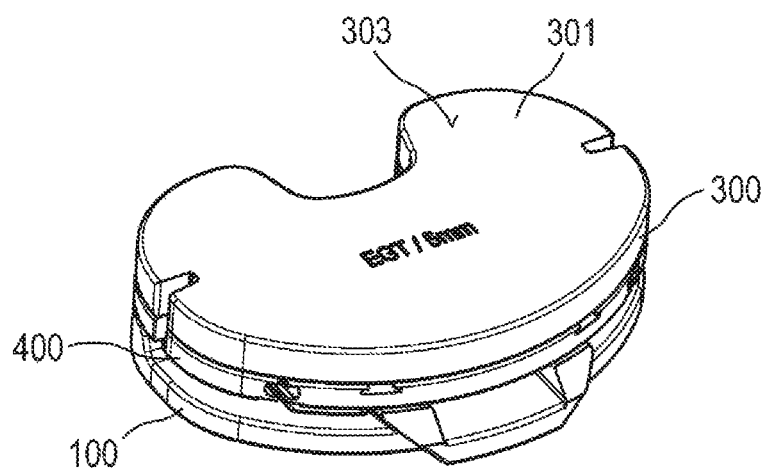
FIG. 27 shows a schematic perspective view of a further instrument configuration of the instrument system according to FIG. 1, in which the second femoral component is releasably connected to the spacer element and the tibial component.

FIG. 27 shows a further instrument configuration. Said further instrument configuration comprises the tibial component 100, the at least one spacer element 400 and the second femoral component 300.

The two instrument configurations according to FIG. 20 and FIG. 27 can also be referred to as the first instrument configuration and the second instrument configuration. Each of the instrument configurations can be assigned one or more different workflows and/or one or more surgical techniques. Specifically, in the present case the second instrument configuration is assigned to a gap balancing, more precisely an EGT. In the present case, the first instrument configuration can be used with different surgical techniques. In the first instrument configuration, the first femoral component 200 is releasably connected to the at least one spacer element 400. The latter is in turn releasably connected to the tibial component 100. In the second instrument configuration, the second femoral component 300 is releasably connected to the at least one spacer element 400. The latter is in turn releasably connected to the tibial component 100.

In the embodiment shown, the first thickness d1 of the first femoral component 200 is 9 mm. The second thickness d2 of the second femoral component 300 is 5 mm. Accordingly, different total thicknesses are obtained in the different instrument configurations according to FIG. 20 and FIG. 27.

In the illustrated embodiment, the modular instrument system 1 has a plurality of spacer elements 400, 400a to 400g of different thickness (see FIG. 1). Apart from their respective proximodistal thickness, the spacer elements 400, 400a to 400g are in the present case identical in terms of their design and function, so that physical and/or functional features of the spacer elements 400, 400a to 400g are not explained below separately for each individual one of the spacer elements. The different spacer elements 400, 400a to 400g can be used individually and interchangeably. For example, one of the spacer elements 400a to 400g can be used instead of the spacer element 400 in the first instrument configuration (FIG. 20) and/or the second instrument configuration (FIG. 27). The respective spacer element 400, 400a to 400g defines the total thickness of the instrument configuration. In other words, by exchanging the spacer elements 400, 400a to 400g, the thickness of the respective instrument configuration can be adjusted for the purpose of determining and/or balancing the joint gap.

In the illustrated embodiment, the proximodistal thicknesses of the spacer elements 400, 400a to 400g are staggered as follows: 10 mm, 11 mm, 12 mm, 14 mm, 16 mm, 18 mm, 22 mm and 26 mm. Accordingly, the spacing thickness t is 10 mm. The spacing thickness tg of the spacer element 400g is 26 mm.

Figure 11:
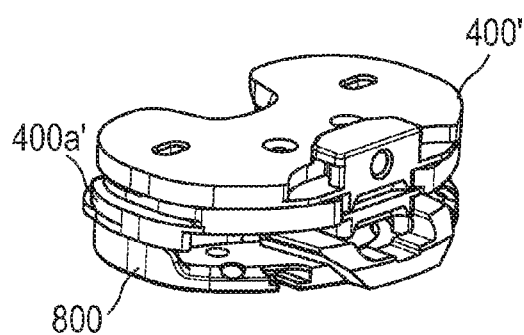
FIGS. 11 to 16 show different schematic perspective views to illustrate a variant of the instrument system according to FIG. 1.
Figure 12:
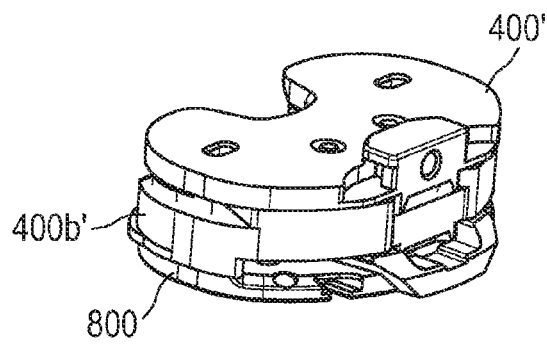
Figure 13:
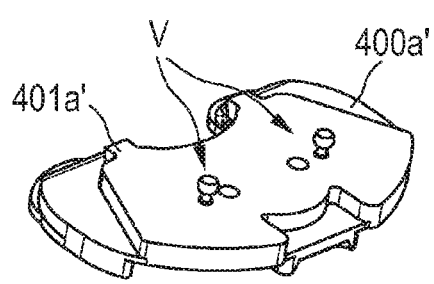
Figure 14:
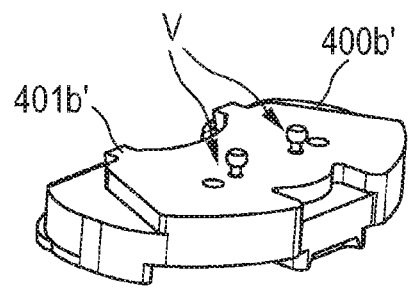
Figure 15:
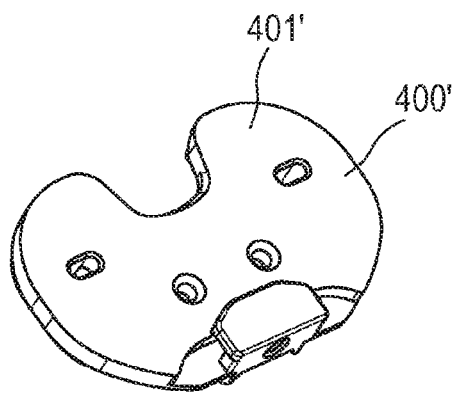
Figure 16:
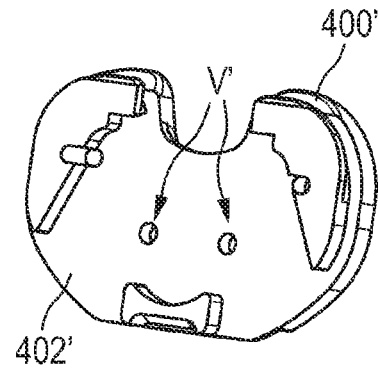

Instead of using the spacer elements individually and interchangeably, a combined use of spacer elements stacked on top of one another is also conceivable. Such an alternative design is illustrated by FIGS. 11 to 16. There, three different spacer elements 400a', 400b' and 400' are shown alone for illustrative purposes. The two spacer elements 400a' and 400b' can also be referred to as the first additional plate and second additional plate. The two additional plates differ in particular in terms of their proximodistal thickness and, interchangeably with each other, can be releasably connected to the tibial component 100. For example, proximodistal thicknesses of 4 mm and/or 8 mm are conceivable. FIGS. 11 and 12 show a releasable connection of the two additional plates 400a', 400b' to the tibial trial plateau 800. The further spacer element 400' can also be referred to as the base plate. The base plate 400' can optionally be releasably connected to one of the two additional plates 400a', 400b'.

For this purpose, complementary connecting portions V, V' are provided. Alternatively, the base plate can be used without one of the additional plates. Of course, the instrument system can also have a plurality of base plates of different thicknesses. The connecting portions V, V' are preferably arranged and/or designed such that the base plate(s) and the additional plates can be connected to one another and/or stacked on top of one another only in defined arrangements.

In the configuration shown in FIG. 11, the first base plate 400a' and the additional plate 400' are stacked on top of each other and releasably connected to each other. This configuration defines an unspecified proximodistal total thickness. In the configuration shown in FIG. 12, the second base plate 400b' and the additional plate 400' are stacked on top of each other and releasably connected to each other. This configuration defines an unspecified additional proximodistal total thickness.

Figure 28:
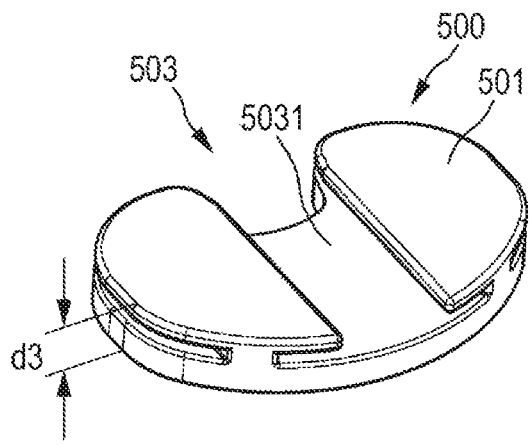
FIG. 28 shows a schematic perspective view of a third femoral component of the instrument system according to FIG. 1.
Figure 29:
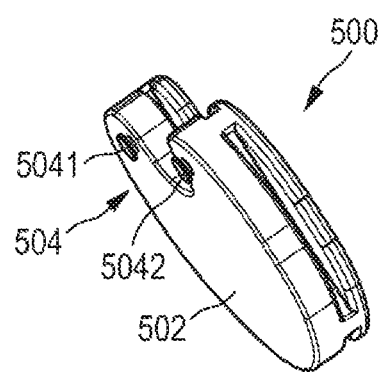
FIG. 29 shows a further schematic perspective view of the third femoral component according to FIG. 28.
Figure 30:
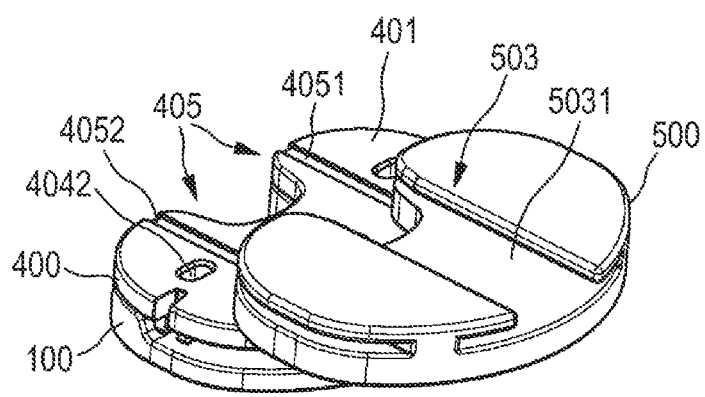
FIG. 30 shows a schematic perspective view of the third femoral component together with the spacer element and the tibial component.

The third femoral component 500 (FIGS. 28 and 29) has a topside 501 and an opposite underside 502. The topside 501 is oriented proximally. The underside 502 is oriented distally. The topside 501 and the underside 502 are spaced apart from each other by a proximodistal third thickness d3. The topside 501 has a proximal linear guide portion 503. The proximal linear guide portion 503 is configured for anteroposterior linearly movable guiding on a complementary linear guide portion of a femoral measuring block FM (see FIG. 32). The underside 502 has a distal linear guide portion 504. The distal linear guide portion 504 is configured for anteroposterior linearly movable guiding on a proximal linear guide portion 405 of the at least one spacer element 400 (see FIG. 5).

It will be understood that the further spacer elements 400a to 400g also each have such a proximal linear guide portion 405 of this kind. The third femoral component 500 can accordingly be secured for linearly movable guiding on each of the plurality of different spacer elements 400, 400a to 400g.

In the illustrated embodiment, the proximal linear guide portion 503 has a guide groove 5031 that is distally recessed into the topside 501. The guide groove 5031 extends in an anteroposterior direction and is undercut mediolaterally. The complementary linear guide portion (without reference sign) of the femoral measuring block FM is thereby held proximodistally and mediolaterally with form-fit engagement on/in the guide groove 5031. In the anteroposterior direction, the guide groove 5031 and said complementary linear guide portion of the femoral measuring block FM interact in a sliding movement.

In the illustrated embodiment, the distal linear guide portion 504 has at least one guide pin 5041 protruding distally from the underside 502. In the illustrated embodiment, two guide pins 5041, 5042 spaced mediolaterally apart from each other are provided. The complementary proximal linear guide portion 405 of the at least one spacer element 400 (and of the further spacer elements 400a to 400g) accordingly has at least one distally recessed guide groove 4051 extending in the anteroposterior direction. In the present case, there are two guide grooves 4051, 4052 spaced mediolaterally apart from each other. The two guide grooves 4051, 4052 are each undercut mediolaterally. At one end, the two guide pins 5041, 5042 are radially widened and/or have a mushroom head. In this way, the guide pins 5041, 5042 are held on the respective undercut guide groove 4051, 4052 with proximodistal and mediolateral form-fit engagement. In the anteroposterior direction, the guide pins 5041, 5042 and the guide grooves 4051, 4052 each interact in a sliding movement.

Figure 31:
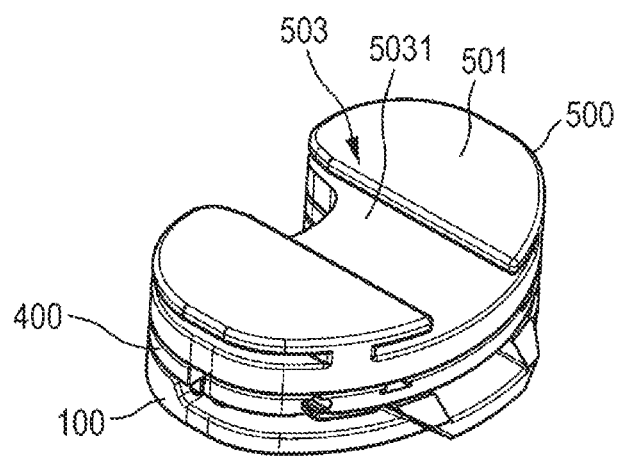
FIG. 31 shows a schematic perspective view of a further instrument configuration of the instrument system according to FIG. 1, in which the third femoral component is guided linearly movably in an anteroposterior direction on the spacer element and is indirectly connected to the tibial component.

FIG. 31 shows a further instrument configuration formed using the modular instrument system 1. The instrument configuration according to FIG. 31 can also be referred to as the third instrument configuration and comprises the tibial component 100, the spacer element 400 and the third femoral component 500. The third femoral component 500 is connected to the spacer element 400 and guided linearly movably in the anteroposterior direction in the manner described above. The spacer element 400 is in turn releasably connected to the tibial component 100.

Figure 32:
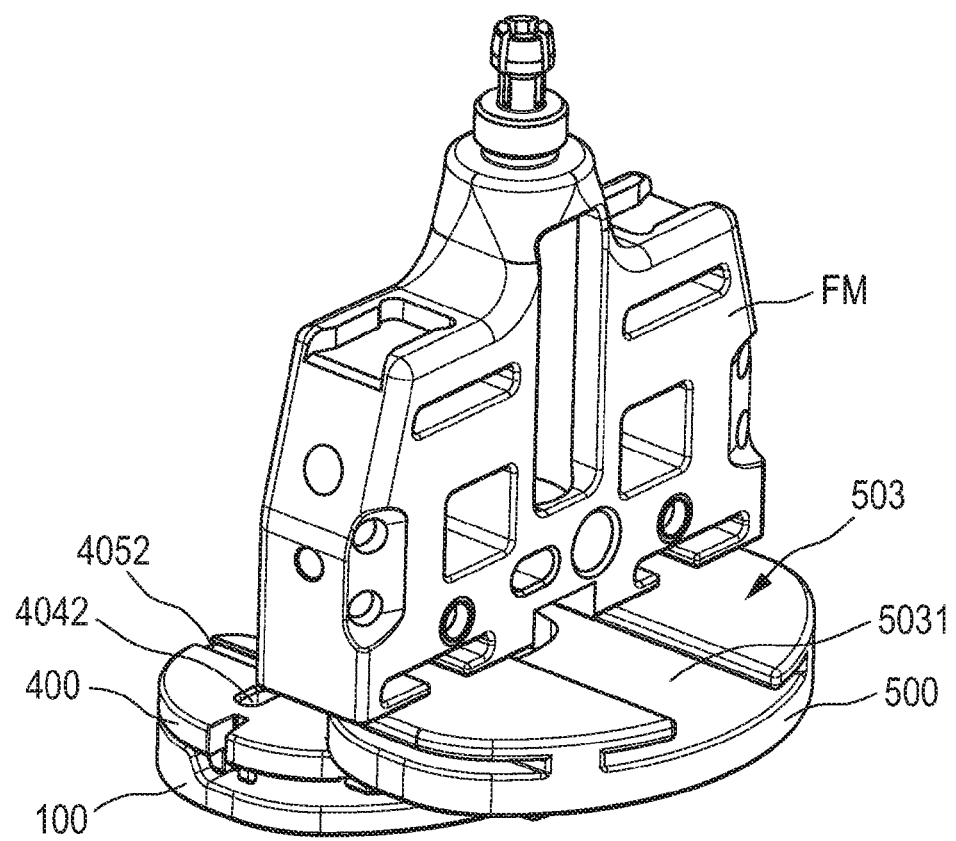
FIG. 32 shows a schematic perspective view of the instrument configuration according to FIG. 31 together with a femoral measuring block.

FIG. 32 shows the use of the instrument configuration according to FIG. 31 in combination with the aforementioned femoral measuring block FM. The femoral measuring block FM has a design and function known to a person skilled in the art and is secured in use to the distal femur of the patient. The instrument configuration according to FIG. 31 is assigned to at least one further surgical technique and serves primarily to determine the joint gap under flexion.

Figure 21:
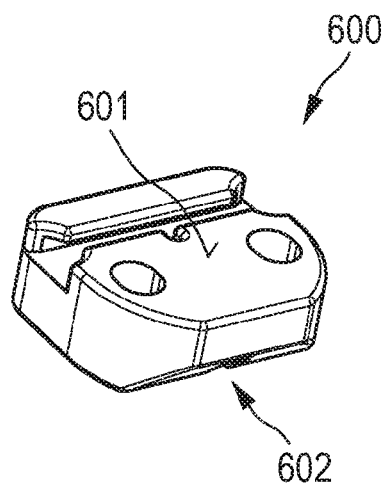
FIG. 21 shows a schematic perspective view of an augmentation element of the instrument system according to FIG. 1.

The augmentation element 600 (see FIG. 21) has a proximal augmentation surface 601 and a distal connecting portion 602. The proximal augmentation surface 601 is configured to bear on the resected distal femur and/or resected posterior femur. The distal connecting portion 602 is configured for releasable connection to a proximal connecting portion 205, 206 of the first femoral component 200. The augmentation element 600 serves to compensate for any defects in the femur. The specific design of the distal connecting portion 602 is not essential as regards the present invention. The same applies to the distal connecting portion 205, 206 of the first femoral component. The decisive factor is that said connecting portions are releasably connectable to each other. This can be effected, for example, by forming a releasable plug-in, latching and/or clamping connection.

In the illustrated embodiment, the topside 201 of the first femoral component 200 has a plurality of proximal connecting portions 205, 206 for connection to the distal connecting portion of the augmentation element 600. In the present case, the two proximal connecting portions 205, 206 are spaced apart mediolaterally from each other.

The augmentation element 600 can optionally be attached to one of the two proximal connecting portions 205, 206.

Figure 22:
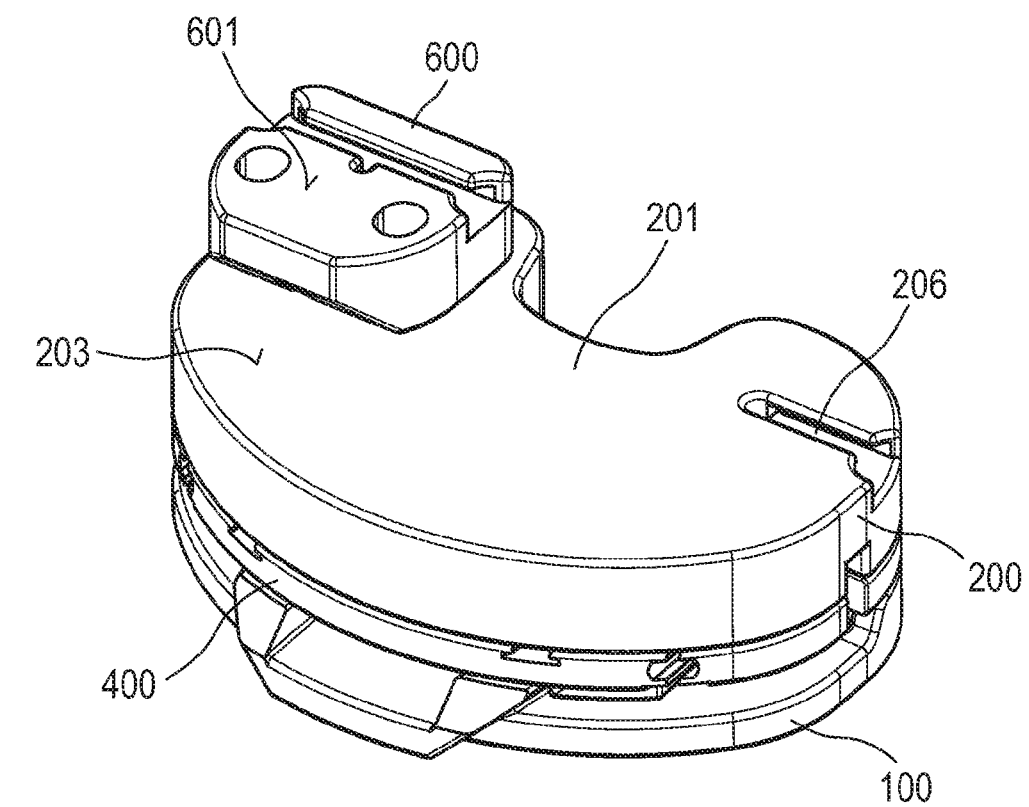
FIG. 22 shows a schematic perspective view of a further instrument configuration of the instrument system according to FIG. 1, in which the augmentation element is mounted releasably on a topside of the first femoral component.

FIG. 22 shows a further instrument configuration. The further instrument configuration according to FIG. 22 is formed using the modular instrument system 1 and can also be referred to as the fourth instrument configuration. In the fourth instrument configuration, the augmentation element 600 is releasably secured to the proximal connecting portion 205 of the first femoral component 200. The second femoral component 200 is in turn releasably connected to the spacer element 400 (or alternatively to one of the plurality of different spacer elements 400a to 400g). The spacer element 400 is releasably connected to the tibial component 100.

Figure 23:
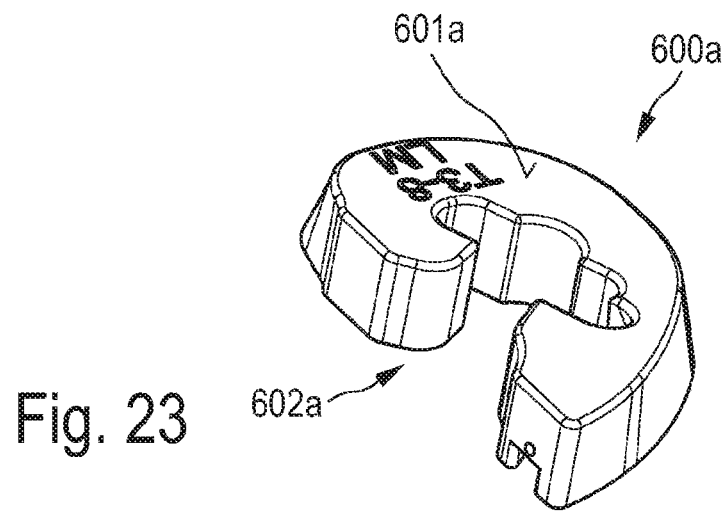
FIG. 23 shows a schematic perspective view of a further augmentation element of the instrument system according to FIG. 1.
Figure 24:
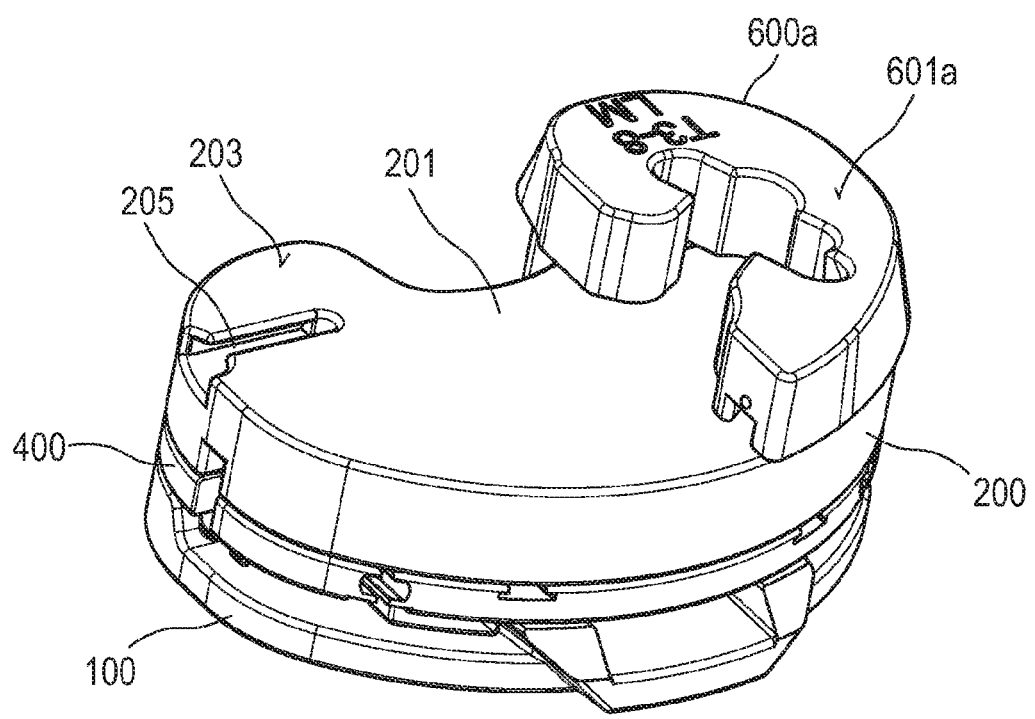
FIG. 24 shows a schematic perspective view of a further instrument configuration of the instrument system according to FIG. 1, in which the further augmentation element is mounted releasably on the topside of the first femoral component.

In the illustrated embodiment, the modular instrument system 1 also has a further augmentation element 600a (see FIG. 23). The further augmentation element 600a is identical to the augmentation element 600 according to FIG. 21 in terms of its design and functionality. The further augmentation element 600a differs from the augmentation element 600 primarily in terms of its anteroposterior and/or mediolateral and/or proximodistal dimensions. The further augmentation element 600a can optionally be secured to one of the two proximal connecting portions 205, 206 of the first femoral component 200 (see FIG. 24).

By means of the augmentation element 600 and/or the further augmentation element 600a, the proximodistal total thickness of the respective instrument configuration can be changed locally. Locally means that the augmentation elements 600, 600a cover the topside 201 of the first femoral component 200 only in sections in the anteroposterior and/or mediolateral direction.

The handle 700 (see FIGS. 1 and 10) serves for simplified, ergonomic manipulation of the respective instrument configuration. By means of the handle 700, the instrument configuration can be inserted into the joint gap and removed therefrom ergonomically and in a way that does not injure the patient. For this purpose, the handle 700 can be coupled to the respective instrument configuration. In the present case, the handle 700 has for this purpose at least one manually actuated coupling device 701. In the illustrated embodiment, the coupling device 701 is configured for releasable coupling to a coupling portion 406 of the at least one spacer element 400 (see FIG. 5). It will be understood that the further spacer elements 400a to 400g also have such a coupling portion.

The at least one coupling device 701 is arranged one end of the handle 700 and has a coupling element 7011. The coupling element 7011 extends between a first end and a second end (each without reference signs). At the first end, the coupling element 7011 has a first coupling portion 7012. At the other end, the coupling element 7011 has an actuating portion 7013. The coupling element 7011 is mounted on the handle 700 so as to be pivotable relative thereto about a pivot axis 7014. In the present case, the pivot axis 7014 is oriented proximodistally. By means of an actuation of the actuation portion 7013, the coupling element 7011 is pivotable about the pivot axis 7014. The first coupling portion 7012 is here shifted in a substantially mediolateral direction on an unspecified circular arc trajectory. The coupling device 701 also has a second coupling portion 7021. The second coupling portion 7021 is arranged at one end of the handle 700 (see FIG. 1).

The coupling portion 406 of the at least one spacer element 400 comprises a first coupling sub-portion 4061 and a second coupling sub-portion 4062. The first coupling sub-portion 4061 is configured for force-fit and/or form-fit interaction with the first coupling portion 7012 of the coupling device 701. In the present case, the first coupling sub-portion 4061 is open anteriorly. The second coupling sub-portion 4062 is configured for force-fit and/or form-fit interaction with the second coupling portion 7021 of the coupling device 701. In the present case, the second coupling sub-portion 4062 is open to the outside.

Figure 10:
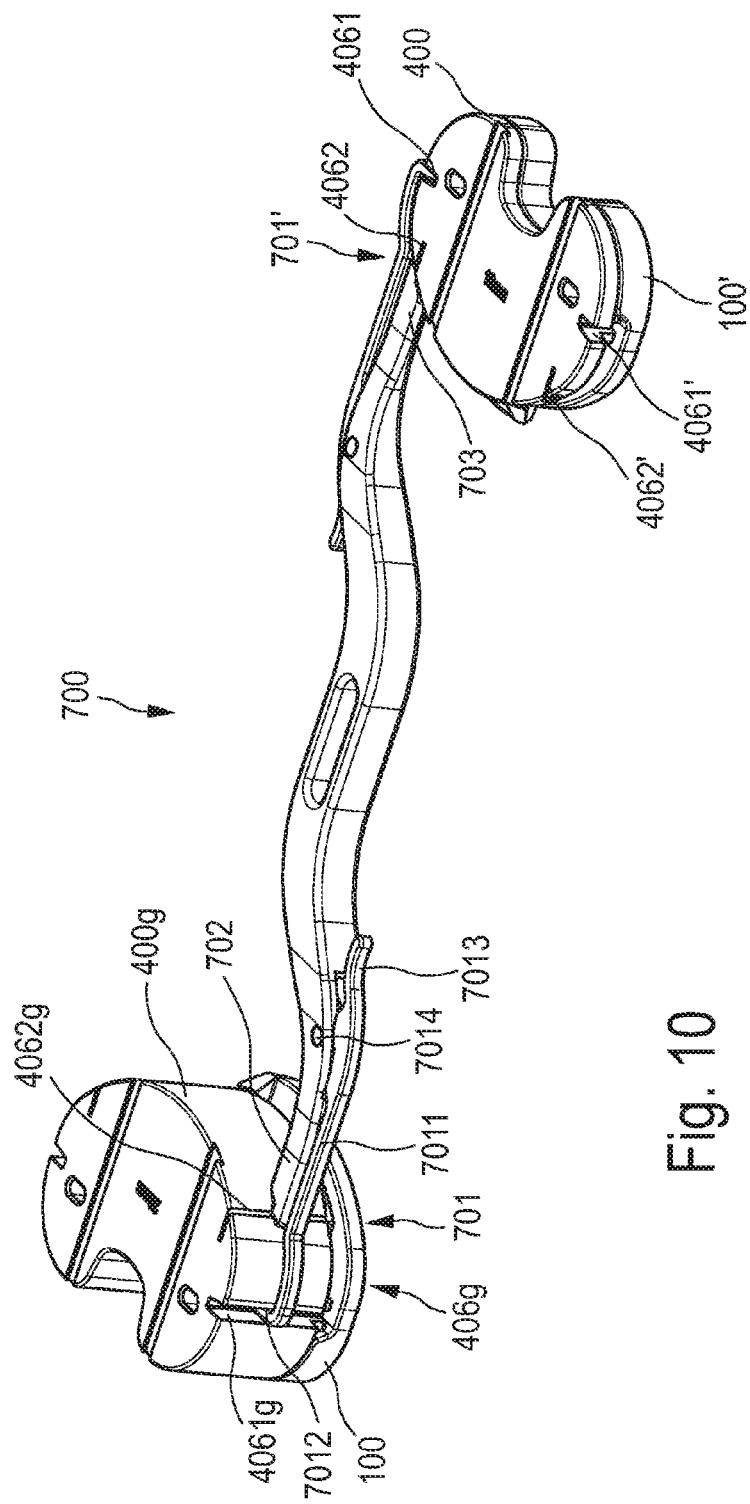
FIG. 10 shows a schematic perspective view of a further instrument configuration of the instrument system according to FIG. 1, in which a handle of the instrument system is releasably coupled on both sides to a respective spacer element of the instrument system.

FIG. 10 shows a situation in which the coupling device 701 is releasably coupled to the coupling portion 406g of the (further) spacer element 400g. In this case, the first coupling portion 7012 engages medially in the first coupling sub-portion 4061g. The second coupling portion 7021 engages posteriorly in the second coupling sub-portion 4062g. In the state shown in FIG. 10, the instrument configuration formed from the tibial component 100 and the (further) spacer element 400g is releasably coupled to the handle 700 by means of the coupling device 701 in a manner secure against loss.

In the illustrated embodiment, the coupling device 701 is arranged at a first end 702 of the handle 700. The handle 700 extends between the first end 702 and a second end 703. In the present case, the second end 703 has a further coupling device 701'. The function and structure of the further coupling device 701' are identical to the coupling device 701. In the situation shown in FIG. 10, an instrument configuration formed from a further tibial component 100' and the spacer element 400 is releasably coupled to the handle 700 by means of the further coupling device 701'.

Figure 5:
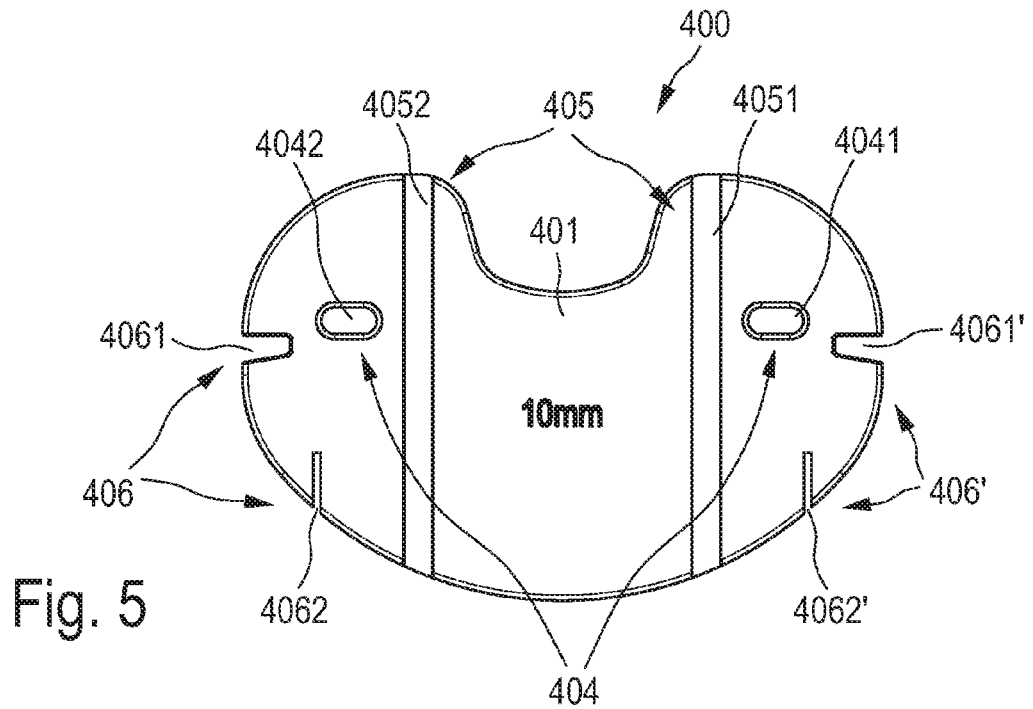
FIG. 5 shows a schematic top view of a spacer element of the instrument system according to FIG. 1.
Figure 6:
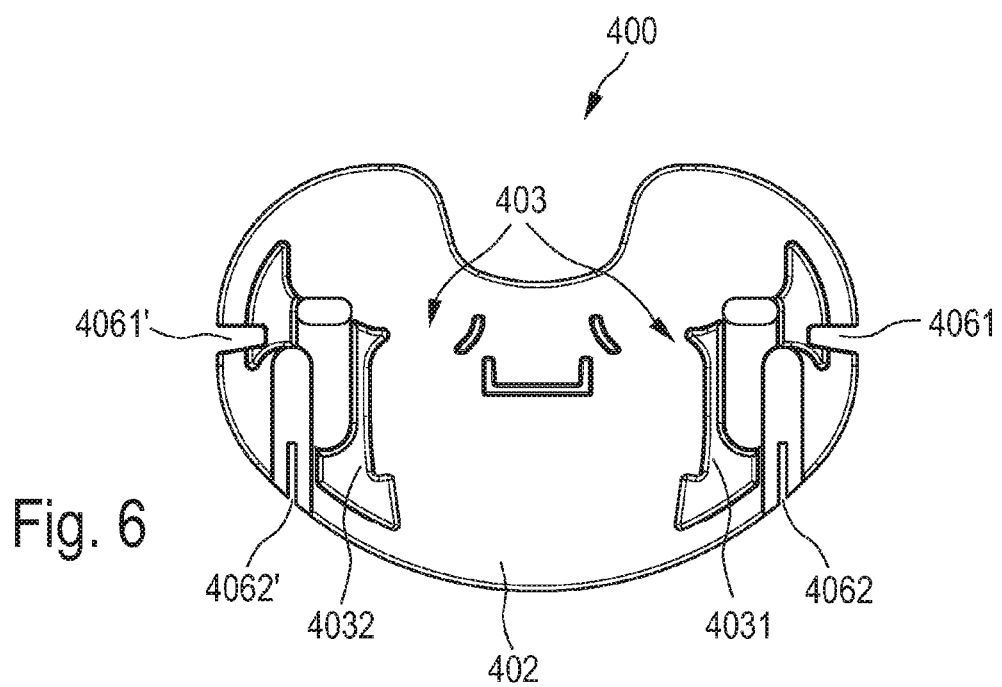
FIG. 6 shows the spacer element according to FIG. 5 in a schematic bottom view.
Figure 7:
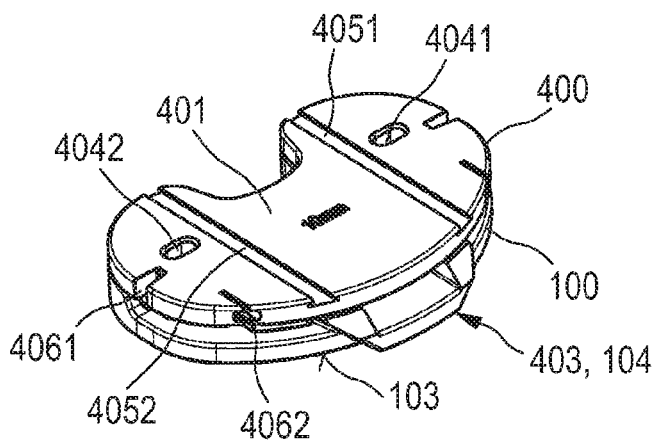
FIG. 7 shows a schematic perspective view of an instrument configuration of the instrument system according to FIG. 1, in which the spacer element is releasably connected to the tibial component.

As is also shown in FIG. 5, the spacer element 400 has a further complementary coupling portion 406'. The further coupling portion 406' is designed mirror-symmetrically to the coupling portion 406 with respect to a sagittal mean longitudinal plane of the spacer element 400. In this way, the coupling device 701 and/or the further coupling device 701' of the handle 700 can optionally be secured to one of the two coupling portions 406, 406'.

In the illustrated embodiment, the handle 700 is curved lengthwise, in particular in an S-shape, between the first end 702 and the second end 703. In the present case, the instrument system 1 can be used both on a right knee and a left knee. The curvature of the handle 700, the presence of the two, in particular symmetrically arranged, coupling devices 701, 701' and of the symmetrically arranged coupling portions 406, 406' serves in particular for the aforementioned usability on both sides.

Figure 3:
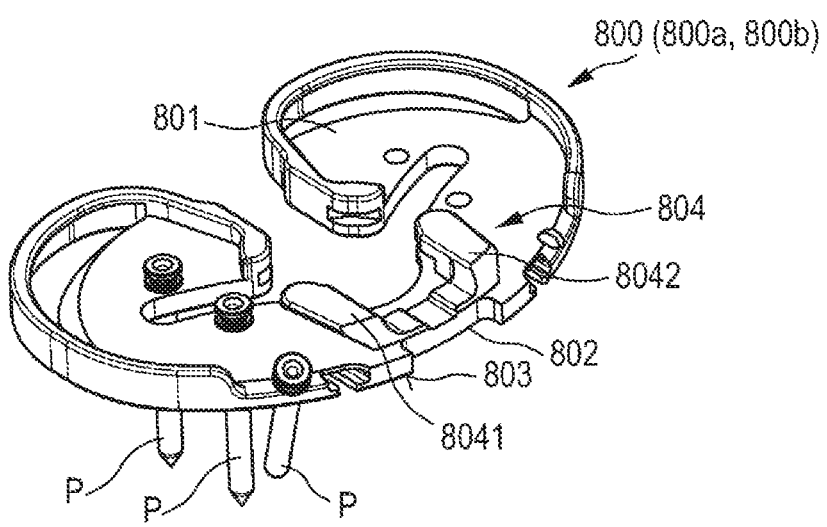
FIG. 3 shows a schematic perspective view of a tibial trial plateau of the instrument system according to FIG. 1.

The tibial trial plateau 800 (see FIG. 3) has a topside 801 and an underside 802. The topside 801 is oriented proximally. The underside 802 is oriented distally. The underside 802 has a fastening surface 803. The fastening surface 803 is configured for attachment to the resected proximal tibia. For this purpose, the tibial trial plateau 800 has a plurality of receiving bores (not shown in detail) for fastening pins P, said receiving bores extending continuously between the topside 801 and the underside 802. By means of the fastening pins P, the tibial trial plateau 800 can be fastened at the tibia in a way that is known to a person skilled in the art. The topside 801 has a proximal connecting portion 804. In the illustrated embodiment, the proximal connecting portion 804 is substantially identical, in terms of its function and design, to the proximal connecting portion 104 of the tibial component 100 (see FIG. 2). Accordingly, the proximal connecting portion 804 is configured for releasable connection to the distal connecting portion 403 of the at least one spacer element 400 (see FIG. 6) or each of the further spacer elements 400a to 400g. The proximal connecting portion 804 in turn has two connecting sub-portions 8041, 8042 spaced apart mediolaterally from each other. In order to avoid repetition, reference is explicitly made to what has been said concerning the connecting sub-portions 1041, 1042.

Figure 8:
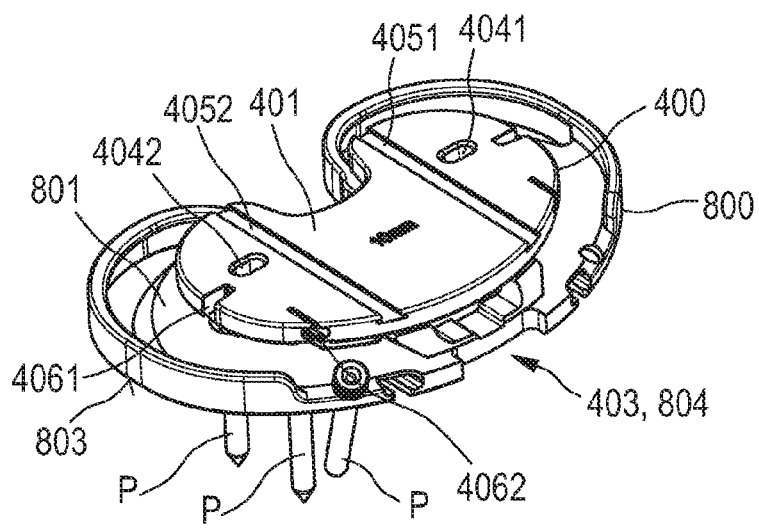
FIG. 8 shows a schematic perspective view of a further instrument configuration of the instrument system according to FIG. 1, in which the spacer element is releasably connected to the tibial trial plateau.

In the illustrated embodiment of the modular instrument system 1, a plurality of different-sized tibial trial plateaus 800, 800a, 800b are present. The further tibial trial plateaus 800a, 800b are not shown separately and are identical to the tibial trial plateau 800 in terms of their basic structure and function. Only their anteroposterior and/or mediolateral dimensions are different. The plurality of tibial trial plateaus 800, 800a, 800b are interchangeable. Thus, for example, with regard to the instrument configuration shown in FIG. 8, in which the at least one spacer element 400 is releasably connected to the tibial trial plateau 800. Instead of the tibial trial plateau 800, one of said further tibial trial plateaus 800a, 800b can be used. A total of 9 different-sized tibial trial plateaus are available in one embodiment.

Figure 4:
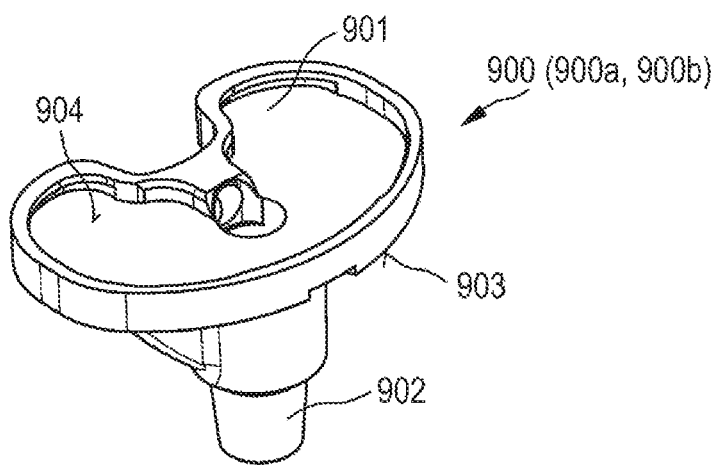
FIG. 4 shows a schematic perspective view of a tibial plateau of the instrument system according to FIG. 1.

The tibial plateau 900 (see FIG. 4) has a topside 901 and a distal anchoring pin 902. The distal anchoring pin 902 protrudes distally from an underside 903. The topside 901 has a proximal connecting portion 904. The proximal connecting portion 904 is configured for releasable connection to the underside 402 of the at least one spacer element 400 (or each of the further spacer elements 400a to 400g).

Figure 9:
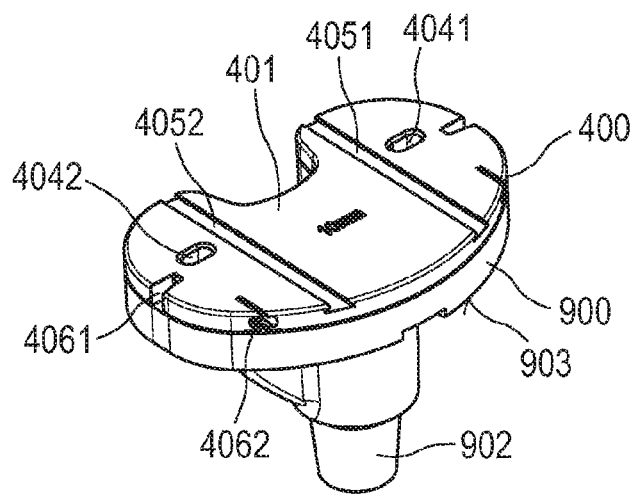
FIG. 9 shows a schematic perspective view of a further instrument configuration of the instrument system according to FIG. 1, in which the spacer element is releasably connected to the tibial plateau.

FIG. 9 shows a further instrument configuration, in which the spacer element 400 is releasably connected to the tibial plateau 900.

In the illustrated embodiment of the modular instrument system 1, a plurality of different-sized tibial plateaus 900, 900a, 900b are present. The tibial plateaus 900, 900a, 900b differ only in terms of their anteroposterior and/or mediolateral dimensions and are intended for implantation in tibial bones of different sizes. The further tibial plateaus 900a, 900b are not shown in detail in the figures. The different tibial plateaus 900, 900a, 900b are interchangeable. Thus, for example, in relation to the instrument configuration shown in FIG. 9. A total of 9 different-sized tibial plateaus are available in one embodiment.

The invention claimed is:

1. A modular instrument system for use in a knee joint replacement operation, the modular instrument system comprising:
    at least one tibial component having a topside and an underside opposite the topside, wherein the underside of the at least one tibial component has a distally oriented flat contact surface, which is configured to bear on a resected proximal tibia,
    a first femoral component having a topside and an underside parallel opposite the topside of the first femoral component, wherein the topside of the first femoral component has a proximally oriented, flat first contact surface, which is spaced apart from the underside of the first femoral component by a proximodistal first thickness and is configured to bear on a resected femur,
    a second femoral component having a topside and an underside parallel opposite the topside of the second femoral component, wherein the topside of the second femoral component has a proximally oriented, flat second contact surface, which is spaced apart from the underside of the second femoral component by a proximodistal second thickness and is configured to bear on a distal femoral cutting jig and to alternatively bear on a posterior femoral cutting jig,
    at least one spacer element having a topside and an underside spaced apart from the topside of the at least one spacer element in parallel by a proximodistal spacing thickness, wherein the underside of the at least one spacer element has a distal connecting portion, which is configured for releasable connection to a complementary proximal connecting portion of the topside of the at least one tibial component, wherein the topside of the at least one spacer element has a proximal connecting portion, which is configured for releasable connection to a complementary distal connecting portion of the underside of the first femoral component and for alternative releasable connection to a complementary distal connecting portion of the underside of the second femoral component,
    wherein the modular instrument system is configured for forming at least a first instrument configuration and a second instrument configuration, wherein in the first instrument configuration the first femoral component and the at least one spacer element are releasably connected to each other, and wherein in the second instrument configuration the second femoral component and the at least one spacer element are releasably connected to each other,
    wherein the at least one spacer element comprises a plurality of spacer elements of different thicknesses with different spacing thicknesses, wherein the plurality of spacer elements of different thicknesses are interchangeably usable individually and/or usable in combination stacked on top of one another.

2. The modular instrument system according to claim 1, wherein the proximodistal first thickness is greater than the proximodistal second thickness.

3. The modular instrument system according to claim 1, further comprising a third femoral component, the third femoral component comprising a topside and an underside spaced apart in parallel by a proximodistal third thickness, wherein the topside of the third femoral component has a proximal linear guide portion, which is configured for anteroposterior linearly movable guiding on a complementary linear guide portion of a femoral measuring block, wherein the underside of the third femoral component has a distal linear guide portion, which is configured for anteroposterior linearly movable guiding on a proximal linear guide portion of the topside of the at least one spacer element, and wherein the modular instrument system is configured for forming a third instrument configuration, in which the third femoral component and the at least one spacer element are connected releasably and movably relative to each other.

4. The modular instrument system according to claim 3, wherein the proximal linear guide portion of the third femoral component has at least one guide groove which is distally recessed into the topside of the third femoral component, extends in an anteroposterior direction and is undercut mediolaterally.

5. The modular instrument system according to claim 3, wherein the distal linear guide portion of the third femoral component has at least one guide pin protruding distally from the underside of the third femoral component, and the proximal linear guide portion of the at least one spacer element has at least one guide groove which is distally recessed into the topside of the at least one spacer element, extends in an anteroposterior direction and is undercut mediolaterally.

6. The modular instrument system according to claim 1, further comprising at least one augmentation element having a proximal augmentation surface for bearing on the resected femur and a distal connecting portion which is configured for releasable connection to a proximal connecting portion of the first femoral component, wherein the modular instrument system is configured for forming a fourth instrument configuration, in which the at least one augmentation element is mounted on the proximally oriented, flat first contact surface of the first femoral component.

7. The modular instrument system according to claim 6, wherein the proximal connecting portion of the first femoral component comprises a plurality of proximal connecting portions that are each recessed into the topside of the first femoral component and spaced apart mediolaterally and/or anteroposteriorly from each other.

8. The modular instrument system according to claim 6, wherein the at least one augmentation element comprises a plurality of differently shaped and/or different-sized augmentation elements that are usable interchangeably with each other.

9. The modular instrument system according to claim 1, further comprising a handle having at least one manually actuated coupling device configured for releasable coupling to a coupling portion of the at least one spacer element.

10. The modular instrument system according to claim 9, wherein the handle extends between a first end and a second end and has a respective coupling device at both ends.

11. The modular instrument system according to claim 9, further comprising at least one tibial trial plateau having a topside and an underside distally opposite the topside of the at least one tibial trial plateau, wherein the underside of the at least one tibial trial plateau has a distally oriented fastening surface for fastening to the resected proximal tibia, wherein the topside of the at least one tibial trial plateau has a proximal connecting portion which is configured for releasable connection to the distal connecting portion of the at least one spacer element, and wherein the modular instrument system is configured for forming a fifth instrument configuration, in which the at least one spacer element and the at least one tibial trial plateau are releasably connected to each other.

12. The modular instrument system according to claim 11, wherein the at least one tibial trial plateau comprises a plurality of different-sized tibial trial plateaus that are usable interchangeably with one another.

13. The modular instrument system according to claim 1, further comprising at least one tibial plateau having a topside and a distal anchoring pin for anchoring to the resected proximal tibia, wherein the topside of the at least one tibial plateau has a proximal connecting portion which is configured for releasable connection to the distal connecting portion of the at least one spacer element, and wherein the modular instrument system is configured for forming a sixth instrument configuration, in which the at least one spacer element and the at least one tibial plateau are releasably connected to each other.

14. The modular instrument system according to claim 13, wherein the at least one tibial plateau comprises a plurality of different-sized tibial plateaus that are usable interchangeably with one another.

15. A modular instrument system for use in a knee joint replacement operation, the modular instrument system comprising:

at least one tibial component having a topside and an underside opposite the topside, wherein the underside of the at least one tibial component has a distally oriented flat contact surface, which is configured to bear on a resected proximal tibia, a first femoral component having a topside and an underside parallel opposite the topside of the first femoral component, wherein the topside of the first femoral component has a proximally oriented, flat first contact surface, which is spaced apart from the underside of the first femoral component by a proximodistal first thickness and is configured to bear on a resected femur, a second femoral component having a topside and an underside parallel opposite the topside of the second femoral component, wherein the topside of the second femoral component has a proximally oriented, flat second contact surface, which is spaced apart from the underside of the second femoral component by a proximodistal second thickness and is configured to bear on a distal femoral cutting jig and to alternatively bear on a posterior femoral cutting jig, at least one spacer element having a topside and an underside spaced apart from the topside of the at least one spacer element in parallel by a proximodistal spacing thickness, wherein the underside of the at least one spacer element has a distal connecting portion, which is configured for releasable connection to a complementary proximal connecting portion of the topside of the at least one tibial component, wherein the topside of the at least one spacer element has a proximal connecting portion, which is configured for releasable connection to a complementary distal connecting portion of the underside of the first femoral component and for alternative releasable connection to a complementary distal connecting portion of the underside of the second femoral component, wherein the modular instrument system is configured for forming at least a first instrument configuration and a second instrument configuration, wherein in the first instrument configuration the first femoral component and the at least one spacer element are releasably connected to each other, and wherein in the second instrument configuration the second femoral component and the at least one spacer element are releasably connected to each other, and the modular instrument system further comprising a third femoral component, the third femoral component comprising a topside and an underside spaced apart in parallel by a proximodistal third thickness, wherein the topside of the third femoral component has a proximal linear guide portion, which is configured for anteroposterior linearly movable guiding on a complementary linear guide portion of a femoral measuring block, wherein the underside of the third femoral component has a distal linear guide portion, which is configured for anteroposterior linearly movable guiding on a proximal linear guide portion of the topside of the at least one spacer element, and wherein the modular instrument system is configured for forming a third instrument configuration, in which the third femoral component and the at least one spacer element are connected releasably and movably relative to each other.

16. A modular instrument system for use in a knee joint replacement operation, the modular instrument system comprising:

at least one tibial component having a topside and an underside opposite the topside, wherein the underside of the at least one tibial component has a distally oriented flat contact surface, which is configured to bear on a resected proximal tibia, a first femoral component having a topside and an underside parallel opposite the topside of the first femoral component, wherein the topside of the first femoral component has a proximally oriented, flat first contact surface, which is spaced apart from the underside of the first femoral component by a proximodistal first thickness and is configured to bear on a resected femur, a second femoral component having a topside and an underside parallel opposite the topside of the second femoral component, wherein the topside of the second femoral component has a proximally oriented, flat second contact surface, which is spaced apart from the underside of the second femoral component by a proximodistal second thickness and is configured to bear on a distal femoral cutting jig and to alternatively bear on a posterior femoral cutting jig, at least one spacer element having a topside and an underside spaced apart from the topside of the at least one spacer element in parallel by a proximodistal spacing thickness, wherein the underside of the at least one spacer element has a distal connecting portion, which is configured for releasable connection to a complementary proximal connecting portion of the topside of the at least one tibial component, wherein the topside of the at least one spacer element has a proximal connecting portion, which is configured for releasable connection to a complementary distal connecting portion of the underside of the first femoral component and for alternative releasable connection to a complementary distal connecting portion of the underside of the second femoral component, wherein the modular instrument system is configured for forming at least a first instrument configuration and a second instrument configuration, wherein in the first instrument configuration the first femoral component and the at least one spacer element are releasably connected to each other, and wherein in the second instrument configuration the second femoral component and the at least one spacer element are releasably connected to each other, and the modular instrument system further comprising at least one augmentation element having a proximal augmentation surface for bearing on the resected femur and a distal connecting portion which is configured for releasable connection to a proximal connecting portion of the first femoral component, wherein the modular instrument system is configured for forming a fourth instrument configuration, in which the at least one augmentation element is mounted on the proximally oriented, flat first contact surface of the first femoral component.

17. A modular instrument system for use in a knee joint replacement operation, the modular instrument system comprising:

at least one tibial component having a topside and an underside opposite the topside, wherein the underside of the at least one tibial component has a distally oriented flat contact surface, which is configured to bear on a resected proximal tibia, a first femoral component having a topside and an underside parallel opposite the topside of the first femoral component, wherein the topside of the first femoral component has a proximally oriented, flat first contact surface, which is spaced apart from the underside of the first femoral component by a proximodistal first thickness and is configured to bear on a resected femur, a second femoral component having a topside and an underside parallel opposite the topside of the second femoral component, wherein the topside of the second femoral component has a proximally oriented, flat second contact surface, which is spaced apart from the underside of the second femoral component by a proximodistal second thickness and is configured to bear on a distal femoral cutting jig and to alternatively bear on a posterior femoral cutting jig, at least one spacer element having a topside and an underside spaced apart from the topside of the at least one spacer element in parallel by a proximodistal spacing thickness, wherein the underside of the at least one spacer element has a distal connecting portion, which is configured for releasable connection to a complementary proximal connecting portion of the topside of the at least one tibial component, wherein the topside of the at least one spacer element has a proximal connecting portion, which is configured for releasable connection to a complementary distal connecting portion of the underside of the first femoral component and for alternative releasable connection to a complementary distal connecting portion of the underside of the second femoral component, wherein the modular instrument system is configured for forming at least a first instrument configuration and a second instrument configuration, wherein in the first instrument configuration the first femoral component and the at least one spacer element are releasably connected to each other, and wherein in the second instrument configuration the second femoral component and the at least one spacer element are releasably connected to each other, and the modular instrument system further comprising at least one tibial plateau having a topside and a distal anchoring pin for anchoring to the resected proximal tibia, wherein the topside of the at least one tibial plateau has a proximal connecting portion which is configured for releasable connection to the distal connecting portion of the at least one spacer element, and wherein the modular instrument system is configured for forming a sixth instrument configuration, in which the at least one spacer element and the at least one tibial plateau are releasably connected to each other.

* * * * *